US010053155B2

(12) United States Patent
Stein

(10) Patent No.: US 10,053,155 B2
(45) Date of Patent: Aug. 21, 2018

(54) VEHICLE BODY AND METHOD FOR PRODUCING THE VEHICLE BODY

(71) Applicant: Bayerische Motoren Werke Aktiengesellschaft, Munich (DE)

(72) Inventor: Michael Stein, Roehrmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/966,131

(22) Filed: Dec. 11, 2015

(65) Prior Publication Data

US 2016/0096551 A1 Apr. 7, 2016

Related U.S. Application Data

(63) Continuation of application No. PCT/EP2014/061777, filed on Jun. 6, 2014.

(30) Foreign Application Priority Data

Jun. 13, 2013 (DE) .................. 10 2013 211 076

(51) Int. Cl.
*B62D 25/08* (2006.01)
*B62D 27/02* (2006.01)
(Continued)

(52) U.S. Cl.
CPC ............. *B62D 25/08* (2013.01); *B62D 27/02* (2013.01); *B62D 29/008* (2013.01); *B62D 65/024* (2013.01)

(58) Field of Classification Search
CPC ...... B62D 25/08; B62D 27/02; B62D 29/008; B62D 65/024
(Continued)

(56) References Cited

U.S. PATENT DOCUMENTS 6,846,037 B2 * 1/2005 Engels .................... B60R 19/18
296/187.11
2006/0103170 A1 * 5/2006 Ikemoto .............. B62D 25/087
296/203.04
(Continued)

FOREIGN PATENT DOCUMENTS

DE 101 09 724 A1 11/2002
EP 2 399 805 A2 12/2011
(Continued)

OTHER PUBLICATIONS

International Search Report (PCT/ISA/210) issued in PCT Application No. PCT/EP2014/061777 dated Nov. 19, 2014 with English translation (Four (4) pages).
(Continued)

*Primary Examiner* — Joseph D. Pape
(74) *Attorney, Agent, or Firm* — Crowell & Moring LLP

(57) ABSTRACT

A vehicle body of shell construction has a rear frame extending in the transverse direction of the vehicle. The rear frame has a support rear panel configured as an inner shell and a rear panel configured as an outer shell. The support rear panel is composed of a center part and at least two side parts. The center part is configured as a lock counterpart for a lock of a rear flap. In the region of the lock counterpart, the rear frame is solely comprised of the center part as the inner shell and the support rear panel as the outer shell, without sheet metal doubling or reinforcement structures.

12 Claims, 3 Drawing Sheets

(51) Int. Cl.
*B62D 29/00* (2006.01)
*B62D 65/02* (2006.01)

(58) Field of Classification Search
USPC ............... 296/203.04, 193.08, 146.8, 76
See application file for complete search history.

(56) References Cited

U.S. PATENT DOCUMENTS

2007/0236049 A1* 10/2007 Chapman ............. B62D 25/087
296/193.08
2015/0298739 A1   10/2015 Buschjohann et al.

FOREIGN PATENT DOCUMENTS

| EP | 2 415 655 A1 | 2/2012 |
|---|---|---|
| JP | 2000-103363 A | 4/2000 |
| JP | 2001-301657 A | 10/2001 |
| JP | 2006-137353 A | 6/2006 |
| WO | WO 2014/063687 A2 | 5/2014 |

OTHER PUBLICATIONS

German-language Search Report issued in counterpart German Application No. 10 2013 211 076.6 dated Jan. 21, 2014 with partial English translation (Ten (10) pages).

* cited by examiner

VEHICLE BODY AND METHOD FOR PRODUCING THE VEHICLE BODY

CROSS REFERENCE TO RELATED APPLICATIONS

This application is a continuation of PCT International Application No. PCT/EP2014/061777, filed Jun. 6, 2014, which claims priority under 35 U.S.C. § 119 from German Patent Application No. 10 2013 211 076.6, filed Jun. 13, 2013, the entire disclosures of which are herein expressly incorporated by reference.

BACKGROUND AND SUMMARY OF THE INVENTION

The present invention relates to a vehicle body of a shell type construction, and to a method for producing the vehicle body.

Various self-supporting vehicle bodies of a shell type construction (also: sheet-metal shell type of construction) are known from the prior art. A characteristic of the shell type of construction is that the various constituent parts of the body, such as for example the roof frame, the individual pillars or the sills are, in each case, assembled from an upper shell and a lower shell. The assembled upper and lower shells form a closed profile with a cavity. The upper and lower shells are also referred to as outer and inner shells.

It is an object of the present invention to provide a vehicle body of shell type construction which, while being inexpensive to produce and assemble, is operationally reliable, durable and of lightweight construction. It is a further object of the present invention to provide a corresponding method for producing the vehicle body.

This and other objects are achieved by way of the embodiments according to the invention.

In a first aspect of the invention, a vehicle body of shell type construction includes a rear frame extending in a vehicle transverse direction. The rear frame extends transversely over the width of the vehicle at the rear, for example between longitudinal members or between the rear pillars (C pillars). A lock counterpart is normally integrated in the rear frame. The lock of the tailgate engages into the lock counterpart. Furthermore, the rear frame normally serves for the connection of the rear bumper. The rear frame is assembled from a so-called supporting rear panel and a rear panel. The supporting rear panel is in the form of an inner shell, and the rear panel is in the form of an outer shell. The inner and outer shells form a closed hollow profile, as is conventional in the case of the shell type of construction for vehicle bodies.

It is provided according to the invention that the supporting rear panel, that is to say the inner shell of the rear frame, is assembled from a central part and at least two side parts. Thus, according to the invention, the supporting rear panel is in at least three parts. The central part is formed as the lock counterpart for the lock of the tailgate. The multi-part form of the supporting rear panel makes it possible that, in the region of the lock counterpart, the rear frame is assembled from the central part and the rear panel only. There is no need for doubling-up of metal sheets or for other reinforcement elements, such as for example partitions, within the rear frame in the region of the lock counterpart. By virtue of the fact that, according to the invention, the separate central part is provided, the central part can, independently of the two side parts, be configured such that it is stable enough to function as a lock counterpart. A further advantage of the multi-part supporting rear panel is that the components, and thus also the tools required for the same, are smaller. The central part can be constructed and produced independently of the side parts. In this way, it is possible for the material, the material thickness and the geometry of the central part to be configured in accordance with the requirements for the lock counterpart.

Provision is preferably made for the central part to be formed from a thicker material, in particular a metal sheet with a greater sheet-metal thickness, than the two side parts. Owing to the multi-part form, according to the invention, of the supporting rear panel, it is possible for a relatively thick metal sheet to be used only in the central part.

It is furthermore preferably provided that the lock counterpart is a lock striker formed in the central part. The lock striker serves for the engagement of the lock of the tailgate. In particular, the lock striker has, in the prior art, been reinforced by doubling-up of sheet metal. According to the invention, this is no longer necessary, as the central part can, by means of a corresponding geometry or corresponding materials, be constructed independently of the side parts.

For the connection between the side parts and the central part, there are two preferred variants: in the first variant, the central part may overlap the respective side part. In this way, adhesive bonding, riveting and/or welding of the two parts is possible. Here, use is made in particular of spot welding. In the second variant, the side parts may be butt-welded to the central part. The term "tailor welded blanks" is also used in this context.

It is particularly preferably provided that at least one of the side parts overlaps the central part. Specifically, in this way, an adjustment of the total length of the supporting rear panel in the y direction (vehicle transverse direction) is possible. This adjustability in the y-direction permits an expedient connection of the supporting rear panel, at its lateral ends, to further constituent parts of the vehicle body. In particular, the outer ends of the side parts are in each case connected to a longitudinal member, to a luggage compartment and/or to a rear pillar (for example the C pillar) of the vehicle body. This fixed connection of the supporting rear panel at both sides is possible only if the total length of the supporting rear panel is variable during the assembly of the vehicle body.

The central part is preferably manufactured from a thicker material than the side parts. As a result, the central part tends to be heavier than the side parts. It is therefore preferably provided that the central part is designed to be as small as possible. A central part length is defined in the vehicle transverse direction (y-direction). The central part length is, in particular, at most 50 cm, preferably at most 40 cm, and particularly preferably at most 30 cm.

The two side parts and the central part are preferably produced from shaped or formed metal sheets.

The invention furthermore encompasses a method for producing the vehicle body. Here, the method includes the following steps: firstly, the parts of the supporting rear panel are provided. The supporting rear panel forms an inner shell of the rear frame. As already described, the supporting rear panel includes a central part and at least two side parts. A total length of the supporting rear panel is defined in the vehicle transverse direction (y direction). In the following step, the connection of the two side parts to the central part, and the connection of the two side parts to further constituent parts of the vehicle body, are performed. The further constituent parts of the vehicle body are, in particular, longitudinal members, a luggage compartment, or rear pillars (for example C pillars). The side parts are thus fastened in each case by way of their inner ends to the central part.

The outer ends of the side parts are connected to the further constituent parts of the vehicle body. According to the invention, before the connection at least of the final side part to the central part, an adjustment of the total length of the supporting rear panel is performed. In this way, it is possible for the side parts to be able to be fixedly connected without a gap, or with a desired gap dimension, to the further constituent parts of the vehicle body. In particular, it is provided that at least one side part overlaps the central part, such that the adjustability of the total length is possible in an expedient manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
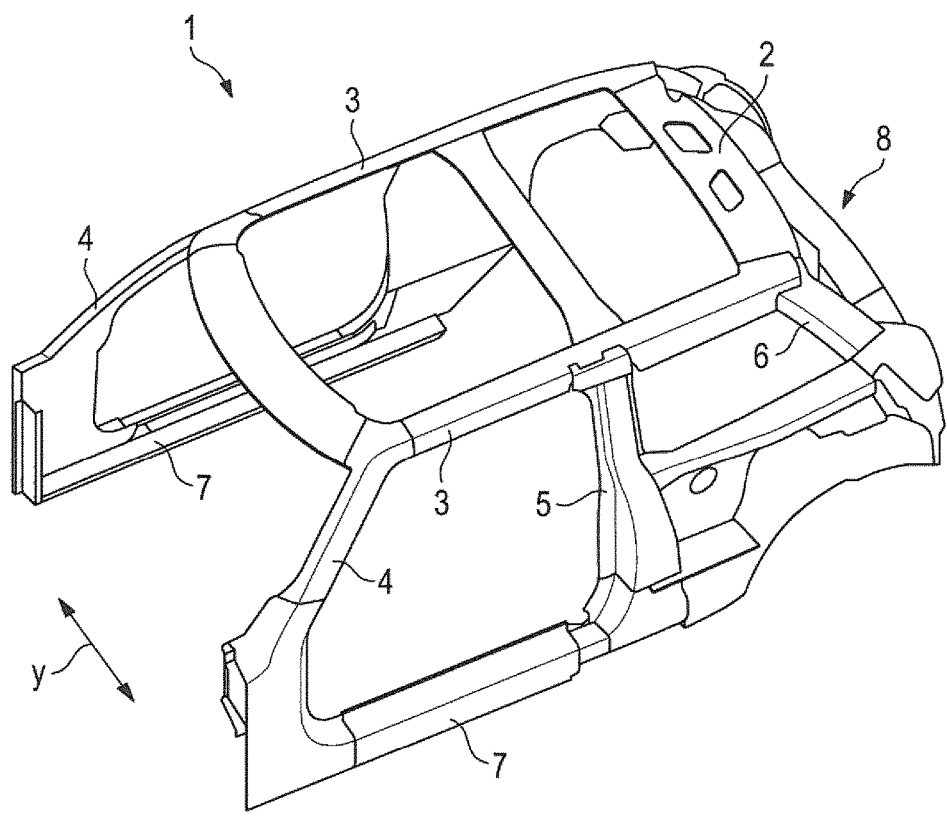
FIG. 1 is a perspective view of a vehicle body according to the invention as per an exemplary embodiment.

An exemplary embodiment of a vehicle body 1 will be described below on the basis of FIGS. 1 to 5.

The vehicle body 1 includes at least one rear window frame 2 which connects two parallel-running roof frames 3 to one another. Two sills 7 extend in parallel in the lower region. The sills 7 are connected to the roof frames 3 by way of A pillars 4, B pillars 5 and C pillars 6. In the rear region, a rear frame 8 runs parallel to the rear window frame 2. A tailgate (not illustrated) would close off the region between the rear window frame 2 and the rear frame 8. Accordingly, the tailgate is fastened to the rear window frame 2 by way of hinges. A lock in the tailgate engages into the rear frame 8.

The indicated vehicle transverse direction y is defined transversely with respect to the vehicle longitudinal direction. The rear frame 8 extends in the vehicle transverse direction y.

The vehicle body 1 is of a sheet-metal shell type of construction. This means that the individual components, in particular the rear window frame 2, the roof frames 3, the pillars 4, 5, 6, the sills 7 and the rear frame 8 are each assembled from an outer shell and an inner shell. The outer and inner shells will also be referred to as upper and lower shells. For strength, it is crucial that the outer and inner shells in each case form a closed hollow profile.

Figure 2:
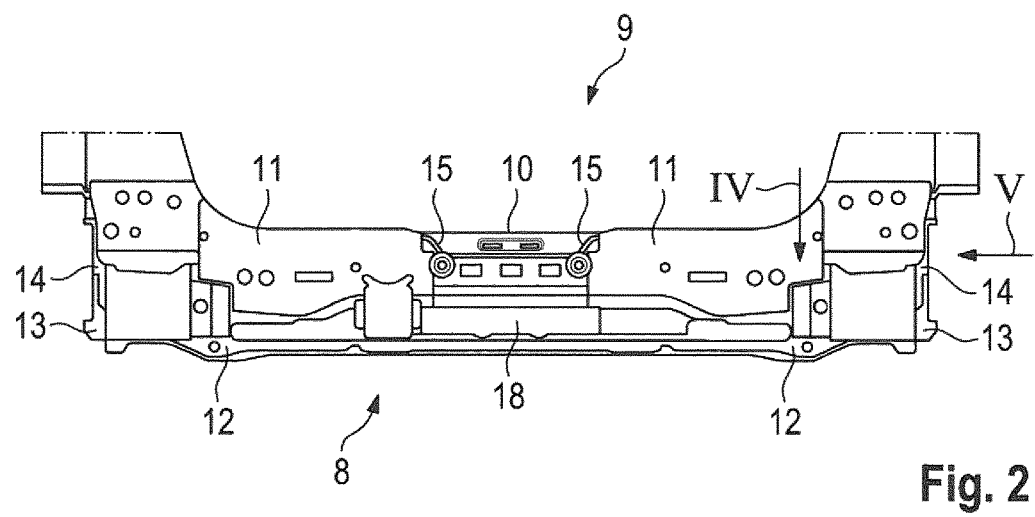
FIG. 2 is a first view of a rear frame of the vehicle body according to the invention as per the exemplary embodiment.

FIG. 2 shows the rear frame 8 in a view in a rearward direction from the front. The rear frame 8 is formed by a so-called supporting rear panel 9. The latter forms the inner shell. The associated outer shell is referred to as rear panel 18.

The supporting rear panel 9 is, according to the invention, of multi-part construction. The supporting rear panel 9 is, in the exemplary embodiment shown, composed of a central part 10 and two side parts 11. The central part 10 and the two side parts 11 are in each case deformed sheet-metal parts. The two side parts 11 overlap the central part 10 and are welded to the central part 10 in the region of overlap.

The central part 10 is in the form of a lock counterpart 15. For this purpose, in particular, a lock striker is formed in the central part 10. A lock of a tailgate can engage into the lock counterpart 15.

The three-part form of the supporting rear panel 9 makes it possible, for the central part 10, to select a corresponding material, a corresponding material thickness and a corresponding geometry optimized for the function as the lock counterpart 15. Here, the configuration of the central part 10 is independent of the side parts 11. Thus, on the central part 10, there is no need for sheet-metal reinforcement, doubling-up of metal sheets, reinforcement elements or partitions. In this region, only the central part 10 in combination with the rear panel 18 form the rear frame 8, which is stable enough to function as a lock counterpart 15.

FIG. 2 furthermore shows two longitudinal members 12 and a portion of a luggage compartment floor 13. At the outer sides, the side parts 11 are in each case fixedly connected to one of the longitudinal members 12 and to the luggage compartment floor 13. This fixed connection to the further constituent parts of the vehicle body is possible because the multi-part design of the supporting rear panel 9 permits a variable total length 17 in the vehicle transverse direction y.

Figure 3:
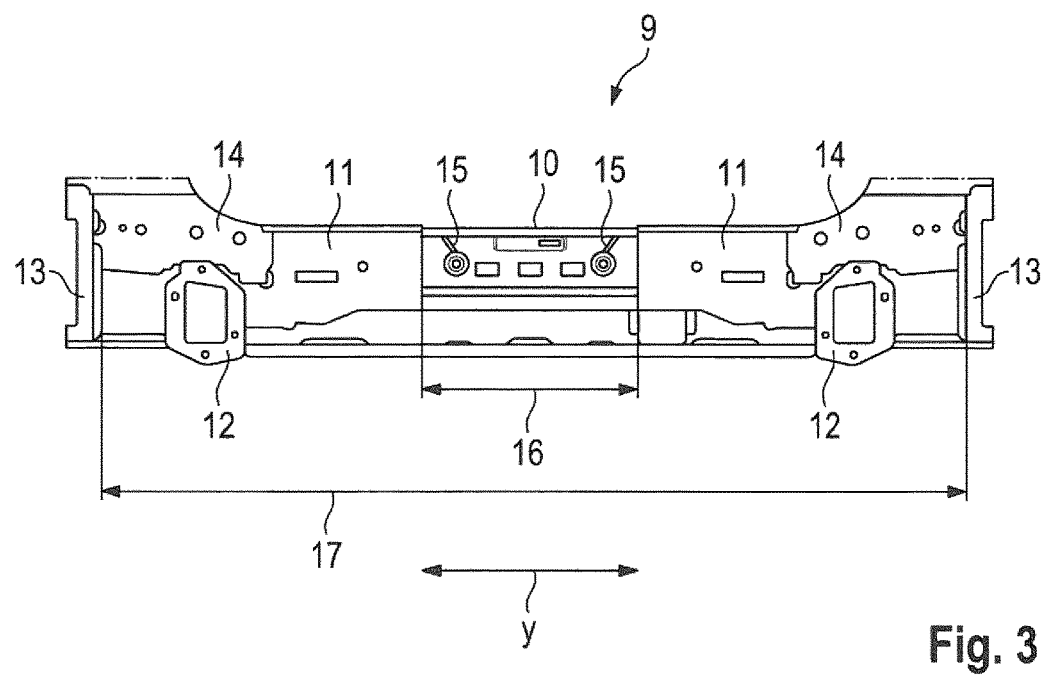
FIG. 3 is a second view of the rear frame of the vehicle body according to the invention as per the exemplary embodiment.

This is illustrated in particular in FIG. 3. FIG. 3 shows a view of the rear frame 8 from the rear in a forward direction. The rear panel 18 has in this case been omitted. In FIG. 3, the central part 10 extends in the vehicle transverse direction y over a central part length 16. The entire supporting rear panel 9 extends in the vehicle transverse direction y over the total length 17.

By virtue of the fact that the side parts 11 overlap the central part 10, an adjustment of the total length 17 is possible during the assembly of the vehicle body 1. The central part length 16 is configured to be as short as possible in order to save weight.

FIG. 3 also shows that, in the region of the side parts 11, lateral partitions 14 can be used to reinforce the rear frame 8. However, as already described, no such reinforcements are required in the region of the central part 10.

Figure 4:
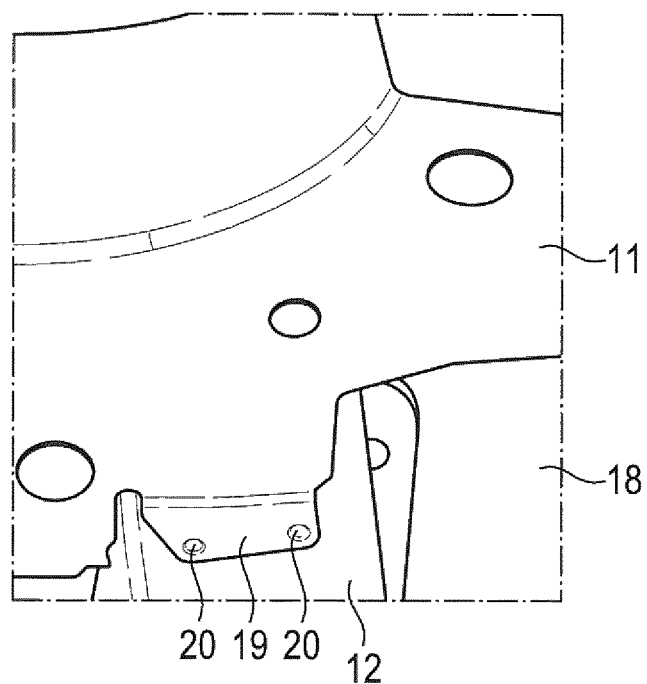
FIG. 4 is the view IV indicated in FIG. 2.

FIG. 4 shows the view indicated by arrow IV in FIG. 2. From FIG. 4, it can be clearly seen how the side part 11 is fixedly connected by way of a tab 19 to the corresponding longitudinal member 12. For this purpose, the tab 19 is fixedly connected to the longitudinal member 12 by way of weld spots 20.

Figure 5:
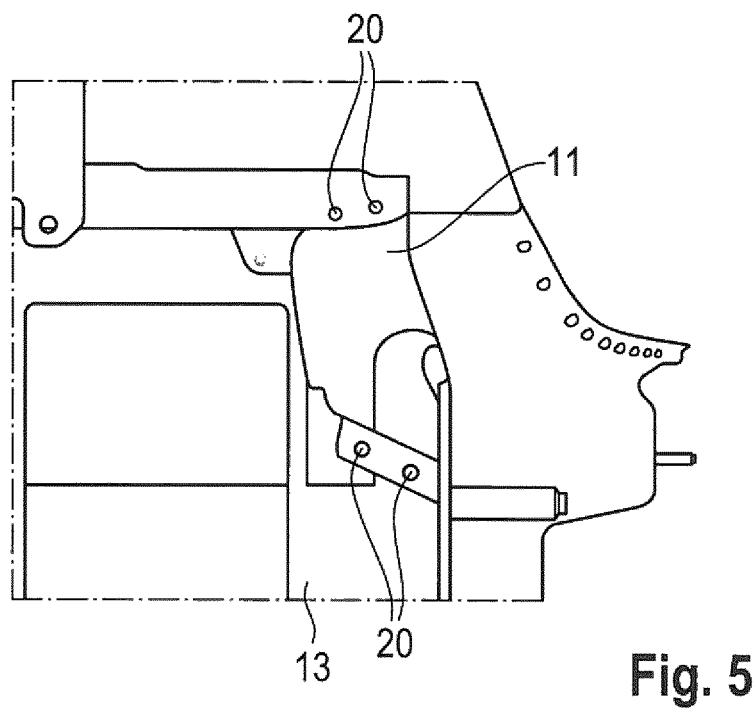
FIG. 5 is the view V indicated in FIG. 2.

FIG. 5 shows the view, denoted by arrow V, from FIG. 2. FIG. 5 shows the connection of one of the side parts 11 to a portion of the luggage compartment floor 13. In this illustration, it can be clearly seen that the side part 11, which is in the form of a three-dimensional component, that is to say is in the form of a profile and not merely an areal component, is led as far as the luggage compartment floor 13 and is connected to the luggage compartment floor 13 by way of spot welds 20. This refinement of the side parts 11, and in particular the connection to the luggage compartment floor 13 and to the longitudinal members 12, is possible within the context of the invention because the total length 17 of the supporting rear panel 9 can be adjusted during the assembly of the vehicle body 1.

The multi-part configuration of the supporting rear panel 9 makes it possible to use smaller components and thus also smaller tools. In this way, multi-tooling is possible, giving rise to at least a doubled number of units per cycle during the production of the components.

The usage of sheet metal can be reduced, because there is no need for doubling-up of sheet metal, for reinforcement elements or for partitions in the region of the central part 10.

The adjustability in the vehicle transverse direction y permits the connection of the supporting rear panel 9 to the longitudinal members 12 in the rear region and/or laterally with respect to the luggage compartment floor 13.

The multi-part configuration of the supporting rear panel 9 affords more degrees of freedom in the tool design, in particular with regard to contents and geometrical forms. At the same time, this also affords more degrees of freedom in the construction of the individual parts, such that it is possible for the function of stiffness to be implemented on a more individual basis, for example through the configuration of the sheet-metal thickness, geometry and topology. The multi-part form of the supporting rear panel 9 makes it possible to realize a highly flexible concept which can be adapted to a wide variety of derivative requirements, for example split door, hatch, sedan or SUV.

LIST OF REFERENCE NUMERALS

1 Vehicle body
2 Rear window frame
3 Roof frame
4 A pillar
5 B pillar
6 C pillar (rear pillar)
7 Sill
8 Rear frame
9 Supporting rear panel
10 Central part
11 Side part
12 Longitudinal member
13 Luggage compartment floor
14 Lateral partitions
15 Lock counterpart
16 Central part length
17 Total length
18 Rear panel
19 Tab
20 Spot welds The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle body of a shell-type construction, the vehicle body comprising:
    a rear frame extending in a vehicle transverse direction, the rear frame having a supporting rear panel in a form of an inner shell, and a rear panel in a form of an outer shell,
    wherein
    the supporting rear panel comprises a central part and at least two side parts,
    the central part is configured as a lock counterpart of a lock of a tailgate,
    the rear frame, in a region of the lock counterpart, comprises only the central part as the inner shell and the rear panel as the outer shell without any doubling-up of metal sheets and without any reinforcement structures, and
    the central part comprises a thicker material than that of the at least two side parts.

2. The vehicle body according to claim 1, wherein the lock counterpart is a lock striker formed in the central part.

3. The vehicle body according to claim 1, wherein:
    the central part overlaps at least one of the at least two side parts, and
    the central part is adhesively bonded, riveted, brazed and/or welded to at least one of the at least two side parts.

4. The vehicle body according to claim 3, wherein the central part is spot-welded to the at least one of the at least two side parts.

5. The vehicle body according to claim 1, wherein the central part is butt-welded to at least one of the at least two side parts.

6. The vehicle body according to claim 2, wherein the central part is butt-welded to at least one of the at least two side parts.

7. The vehicle body according to claim 1, wherein each of the at least two side parts are connected to a longitudinal member, a luggage compartment and/or a rear pillar of the vehicle body.

8. The vehicle body according to claim 1, wherein:
    the central part has a central part length defined in the vehicle transverse direction, and
    the central part length is not greater than 50 cm.

9. The vehicle body according to claim 1, wherein:
    the central part has a central part length defined in the vehicle transverse direction, and
    the central part length is not greater than 40 cm.

10. The vehicle body according to claim 1, wherein:
    the central part has a central part length defined in the vehicle transverse direction, and
    the central part length is not greater than 30 cm.

11. The vehicle body according to claim 1, wherein the central part and the at least two side parts are deformed metal sheets.

12. The vehicle body according to claim 1, wherein the central part has a transverse direction length less than that of each of the at least two side parts.

\* \* \* \* \*